United States Patent
Ling et al.

(10) Patent No.: US 9,787,463 B2
(45) Date of Patent: Oct. 10, 2017

(54) METHOD AND SYSTEM FOR SERVER-SIDE MESSAGE HANDLING IN A LOW-POWER WIDE AREA NETWORK

(75) Inventors: Curtis Ling, Carlsbad, CA (US); Timothy Gallagher, Encinitas, CA (US); Sridhar Ramesh, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 1088 days.

(21) Appl. No.: 13/485,034

(22) Filed: May 31, 2012

(65) Prior Publication Data

US 2013/0097240 A1    Apr. 18, 2013

Related U.S. Application Data

(60) Provisional application No. 61/547,663, filed on Oct. 14, 2011, provisional application No. 61/555,550, filed on Nov. 4, 2011, provisional application No. 61/569,346, filed on Dec. 12, 2011.

(51) Int. Cl.
| | |
|---|---|
| *G06F 15/16* | (2006.01) |
| *H04L 7/00* | (2006.01) |
| *G06F 1/32* | (2006.01) |
| *H04W 52/02* | (2009.01) |
| *H04L 12/28* | (2006.01) |

(52) U.S. Cl.
CPC .......... *H04L 7/0033* (2013.01); *G06F 1/3209* (2013.01); *G06F 1/3234* (2013.01); *G06F 1/3278* (2013.01); *H04L 12/2801* (2013.01); *H04W 52/02* (2013.01); *Y02B 60/126* (2013.01); *Y02B 60/32* (2013.01); *Y02B 60/50* (2013.01)

(58) Field of Classification Search
USPC ......... 709/227–228, 204–205; 713/723, 340, 713/300; 455/574
See application file for complete search history.

(56) References Cited

U.S. PATENT DOCUMENTS

| | | | |
|---|---|---|---|
| 7,089,580 B1 | 8/2006 | Vogel et al. | |
| 7,194,288 B2 * | 3/2007 | Lee et al. | 455/574 |
| 7,389,528 B1 * | 6/2008 | Beser | 725/111 |
| 7,551,592 B2 | 6/2009 | van Kampen et al. | |
| 7,587,746 B1 * | 9/2009 | Schwartzman et al. | 725/111 |
| 7,603,574 B1 | 10/2009 | Gyugyi et al. | |
| 7,930,000 B2 * | 4/2011 | Quigley et al. | 455/574 |

(Continued)

*Primary Examiner* — Abdullahi E Salad
(74) *Attorney, Agent, or Firm* — McAndrews, Held & Malloy

(57) ABSTRACT

A network device may be operable to manage a network connection of customer premise equipment (CPE). While the CPE is operating in a normal mode of operation, the network device may communicate with the CPE utilizing one or more messages of a first type. While the CPE is operating in a low-power mode of operation, the network device may communicate with the CPE utilizing one or more messages of a second type. The network device may be operable to determine a particular program identifier to be utilized for messages the first type of message, and transmit such message(s) to the CPE. The message(s) transmitted while the CPE is in a low-power mode may comprise MPEG-TS packets having the particular program identifier. The message(s) transmitted while the CPE is not in the low-power mode may comprises MPEG-TS packets not having the particular program identifier.

19 Claims, 14 Drawing Sheets

(56) References Cited

U.S. PATENT DOCUMENTS

| | | |
|---|---|---|
| 2004/0181800 A1 | 9/2004 | Rakib et al. |
| 2004/0240383 A1 | 12/2004 | Davolos et al. |
| 2004/0264396 A1 | 12/2004 | Ginzburg et al. |
| 2005/0025145 A1* | 2/2005 | Rakib et al. .................. 370/389 |
| 2005/0048960 A1 | 3/2005 | Yamauchi et al. |
| 2005/0049013 A1* | 3/2005 | Chang et al. ................. 455/574 |
| 2006/0126660 A1 | 6/2006 | Denney et al. |
| 2007/0195824 A9 | 8/2007 | Chapman et al. |
| 2008/0018427 A1* | 1/2008 | Ezra et al. ................... 340/7.32 |
| 2009/0034415 A1 | 2/2009 | Barr et al. |
| 2009/0132823 A1 | 5/2009 | Grimen et al. |
| 2009/0141901 A1 | 6/2009 | You et al. |
| 2009/0144766 A1 | 6/2009 | Jung et al. |
| 2009/0325533 A1 | 12/2009 | Lele et al. |
| 2010/0062725 A1 | 3/2010 | Ryu et al. |
| 2010/0180139 A1* | 7/2010 | Denney et al. ............... 713/330 |
| 2010/0226297 A1 | 9/2010 | Kasslin et al. |
| 2011/0172000 A1* | 7/2011 | Quigley et al. .............. 455/574 |

* cited by examiner

US 9,787,463 B2

METHOD AND SYSTEM FOR SERVER-SIDE MESSAGE HANDLING IN A LOW-POWER WIDE AREA NETWORK

This patent application makes reference to, claims priority to and claims benefit from U.S. Provisional Patent Application Ser. No. 61/547,663 filed on Oct. 14, 2011; U.S. Provisional Patent Application Ser. No. 61/555,550 filed on Nov. 4, 2011; and U.S. Provisional Patent Application Ser. No. 61/569,346 filed on Oct. 14, 2011.

Each of the above applications is hereby incorporated herein by reference in its entirety.

FIELD OF THE INVENTION

Certain embodiments of the invention relate to networking. More specifically, certain embodiments of the invention relate to a method and system for Server-Side Message Handling in a Low-Power Wide Area Network.

BACKGROUND OF THE INVENTION

Existing networks consume too much power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for server-side message handling in a low-power wide area network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g.," and "for, example" introduce a list of one or more non-limiting examples, instances, or illustrations.

Aspects of the invention may enable the reception and processing of "special messages" (e.g., "wake up" and/or "go to sleep" messages) by a physical layer transceiver (PHY) of a set-top box, a modem, or a gateway (collectively referred to as "customer premise equipment" (CPE)) to control a mode of operation of components of the CPE. For example, processing of special messages may control a mode of operation of a medium access controller (MAC) in a cable modem, a video decoder in a STB, or of both a MAC and video decoder in a gateway (a gateway may perform functions of both a cable modem and STB). In this regard, whether components of a CPE are in a power-saving mode of operation or a normal mode of operation may be controlled via such special messages.

Although cable/DOCSIS networks and equipment (e.g., the CMTS 114 of FIG. 1, the cable modem of FIG. 2, the cable STB of FIG. 3, and the cable gateway of FIG. 4) are utilized herein for illustration, the invention is not so limited, and may be applicable to other networks. For example, aspects of the invention may be applicable to non-DOCSIS cable television networks, satellite television networks, terrestrial television networks, "Fiber to the X" (FTTX) networks (e.g., FIOS and U-VERSE), and/or other broadcast and/or wide-area networks.

Figure 1:
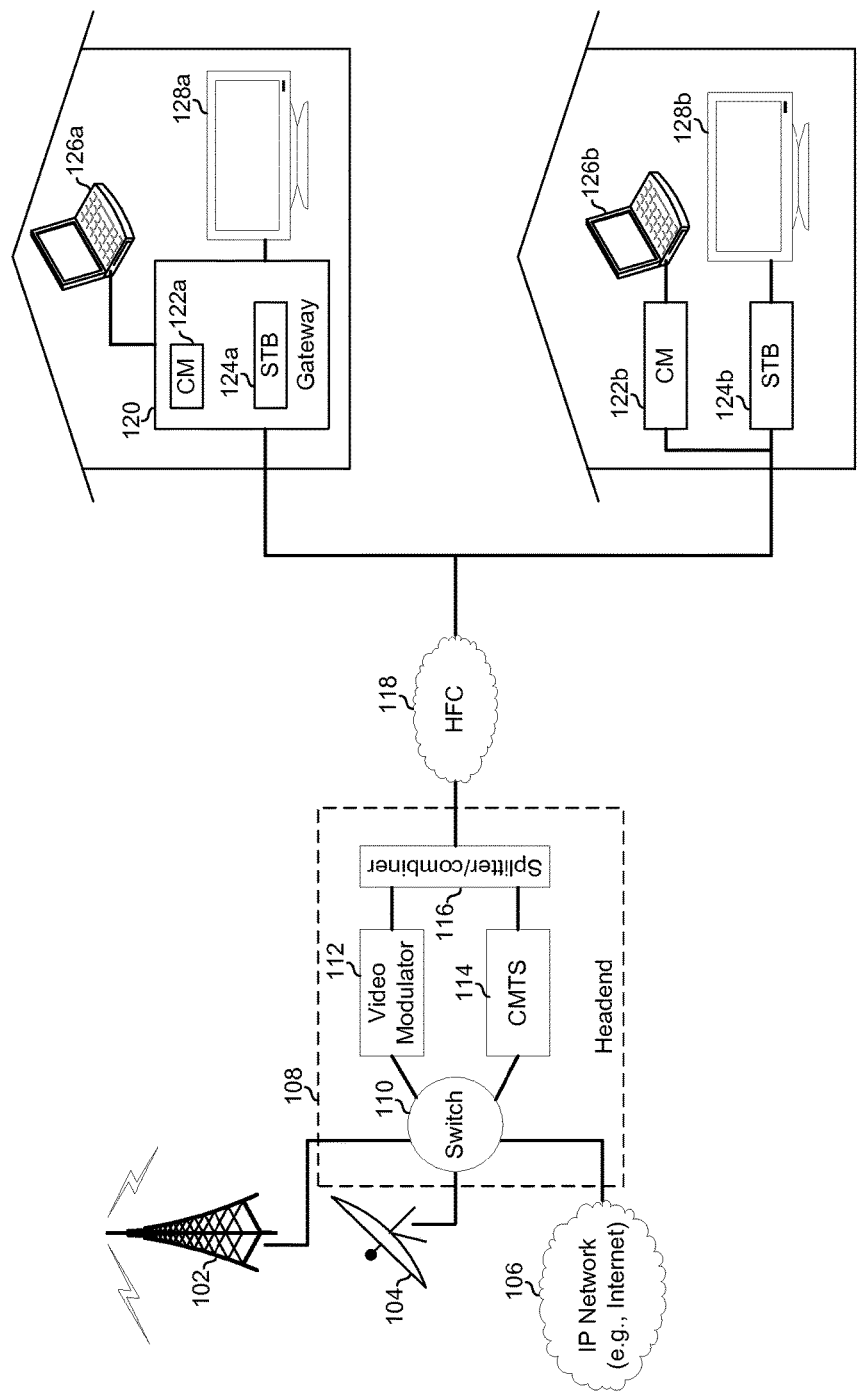
FIG. 1 depicts an exemplary DOCSIS network which may take advantage of aspects of the invention.

FIG. 1 depicts an exemplary DOCSIS network which may take advantage of aspects of the present invention. Shown in FIG. 1 is a terrestrial television antenna 102, a satellite dish 104, an Internet Protocol (IP) network 106, a headend 108, a wide area network (e.g., hybrid fiber-coaxial (HFC) network) 118, a gateway 120, end systems 126a and 126b (e.g., computers), end systems 128a and 128b (e.g., televisions), a cable modem 122b, and a set-top box 124b. The headend 108 comprises a switch 110, a video modulator 112, a cable modem termination system (CMTS) 114, and a splitter/ combiner 116. The gateway 120 may be an instance of the gateway 120 described below with respect to FIG. 4, and may comprise a cable modem module 122a, and a set-top box module 124a. Each of cable modems 122a and 122b may be an instance of the cable modem module 122 described with respect to FIG. 2. Each of set-top boxes 124a and 124b may be an instance of the set-top box module 124 described with respect to FIG. 3.

For downstream traffic, the headend 108 may receive television signals via the antenna 102 and the satellite dish 104, and may receive data via the IP network 106. The switch 110 may convey the television signals to the video modulator 112 and the data to the CMTS 114. The video modulator 112 may modulate the received television signals onto a carrier. The CMTS 114 may modulate the received data onto a carrier. The modulation depth and/or other characteristics of the signal generated by the CMTS may depend on whether the signal is to be communicated to a customer premise device operating in a low-power mode, as described below. The splitter/combiner 116 may combine the outputs of the video modulator 112 and the CMTS 114 and output the combined signal onto the wide area network (WAN) 118 for distribution to CPE. The cable modems 122a and 122b may process the portion of the combined signal that carries the data from the CMTS 114, and the set-top box modules 124a and 124b may process the portion of the combined signal that carries the video from the video modulator 112.

For upstream data, the end systems 126a and 126b may transmit packets to the cable modem 122a and 122b, respectively, which may then modulate the packets onto a carrier for transmission via the WAN 118. The splitter/combiner 116 may then convey the data to the CMTS 114. The CMTS 114 may process the data signals (e.g., verify that they came from a registered cable modem) and convey the data to the IP network 106. The manner in which the signals are processed by the CMTS 114 may depend on whether the device that transmitted the signals was operating in a low-power mode, as described below.

The CMTS 114 may manage connections to the cable modems 122a and 122b. This may include, for example: participating in ranging operations to control the power at which the cable modems 122a and 122b transmit; forwarding of dynamic host configuration protocol (DHCP) messages between a DHCP server and the cable modems 122a and 122b; forwarding of time of day messages between a time of day server and the cable modems 122a and 122b; and managing registration of the cable modems 122a and 122b to grant the cable modems network (e.g., Internet) access. The registration process for a cable modem 122 may comprise the cable modem 122 sending a registration request along with its configuration settings, and the CMTS 114 accepting or rejecting the cable modem based on the configuration settings. The registration process may additionally comprise an exchange of security keys, certificates, or other authentication information.

Conventionally, after a cable modem has successfully registered with the CMTS 114, the CMTS 114 will deregister the cable modem if the cable modem does not communicate with the CMTS 114 for a predetermined period of time. Accordingly, aspects of the present invention may enable a cable modem 122 and the CMTS 114 to coordinate the cable modem 122 operating in a low-power mode ("sleeping") without being deregistered by the CMTS 114. Such coordination between the cable modem 122 and the CMTS 114 may be accomplished through communication of one or more special messages, as is described, for example, with respect to FIG. 5A and/or FIG. 5B.

Aspects of the invention may enable media access planning in a downstream direction. In this regard, the CMTS 114 may communicate (e.g., via one or more special messages) with CPEs (e.g., cable modems) that it serves to coordinate when and how (e.g., on which channel(s)) the CMTS 114 will communicate with the CPEs. Downstream planning may enable a CPE to sleep until the next time at which the plan requires it to listen on the channel(s).

Aspects of the invention may enable the CMTS 114 to dedicate a timeslot occurring at fixed and/or deterministic intervals for the transmission of special messages to one or more sleeping CPEs. Such a scheme may be analogous to an unsolicited grant service, but in the downstream direction. Accordingly, a CPE (e.g., cable modem 122, set-top box 124, or gateway 120) may sleep for the fixed and/or deterministic time between occurrences of the timeslot, wake up and listen to the channel during the timeslot, and then go back to sleep until the next occurrence of the timeslot. Such dedicated timeslots in the downstream direction may coincide in time, and/or have a fixed and/or deterministic time relationship to, unsolicited grants in the upstream direction. In this manner, if there is no upstream activity during the corresponding unsolicited grant, then adjustments may be made to, for example, the duration of the timeslot, the interval between occurrences of the timeslot, etc. The special messages communicated during occurrences of the timeslot may, for example, contain wake up messages. As another example, the special messages communicated during occurrences of the timeslot may comprise data communicated to or from "always on" end systems (e.g., appliances, utility meters, etc.) that may need to communicate over the WAN via a CPE even when the CPE is in a power-save mode.

In an embodiment of the invention, one or more logical channels may be dedicated for the communication of special messages (e.g., messages pertaining to power management) and/or for the communication of traffic to "always-on" end systems, even when a CPE via which the "always-on" end system communicates is in a power-saving mode. For example, in systems utilizing DVB-C2 or DVB-T2, such traffic can be mapped to a dedicated physical layer pipe.

Figure 2:
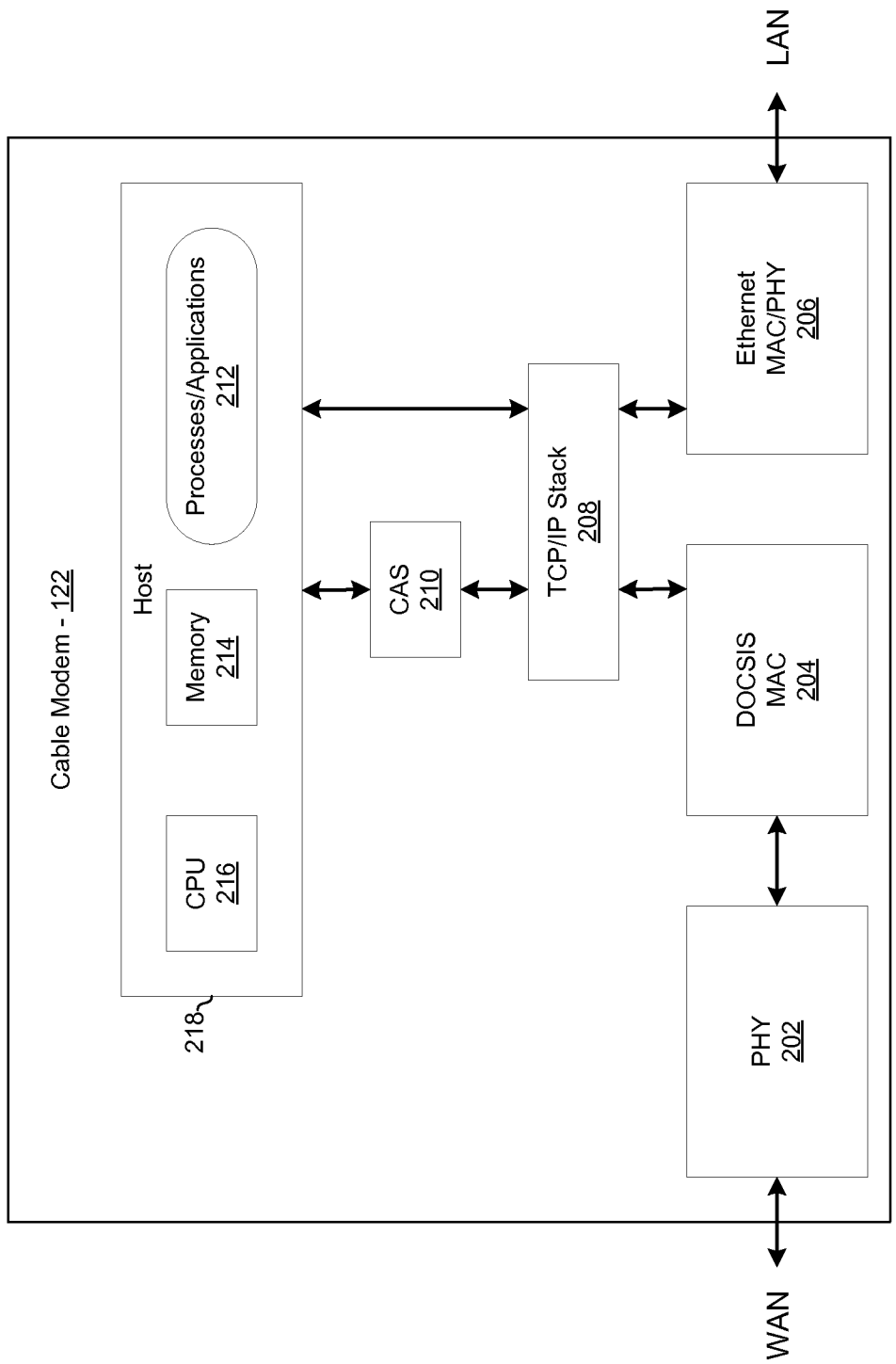
FIG. 2 depicts a cable modem as an example of customer premise equipment (CPE).

FIG. 2 depicts a cable modem as an example of customer premise equipment (CPE). The cable modem 122 comprises a physical layer transceiver (PHY) module 202, DOCSIS medium access controller (MAC) module 204, Ethernet MAC/PHY module 206, a TCP/IP stack module 208, a conditional access module 210, and a host 218 comprising a CPU 216 and memory module 214 which interoperate to execute applications/processes 212.

The PHY module 202 may be operable to receive digital signals from the MAC 204, generate corresponding analog symbols, and transmit the symbols onto the WAN 118. Similarly, the PHY module 202 may be operable to receive analog symbols over the WAN 118, convert the symbols to digital signals, and convey the digital signals to the MAC module 204. The PHY module 202 may be an instance of the PHY module 500 described below with respect to FIG. 5A or the PHY module 550 described below with respect to FIG. 5B. The MAC module 204 may be operable to implement DOCIS media access control protocol(s) for regulating when and/or how the cable modem 122 transmits on the WAN 118. The Ethernet MAC/PHY module 206 may be operable to implement Ethernet physical layer and data link layer protocols such that the cable modem 122 may transmit and receive via an Ethernet local area network (LAN). The TCP/IP stack module 208 may be operable to implement functionality of OSI layers 3 and higher layers to enable the host 218 to communicate via the WAN 118 and/or the LAN. The conditional access module 210 may be operable to prevent the host from transmitting and/or receiving DOCSIS traffic via the WAN 118 if the cable modem 122 is not subscribed to such services. The CPU 216 may execute instructions stored in the memory module 214 and store run-time data in the memory module 214 to execute various processes and/or applications (e.g., an operating system).

Figure 5A:
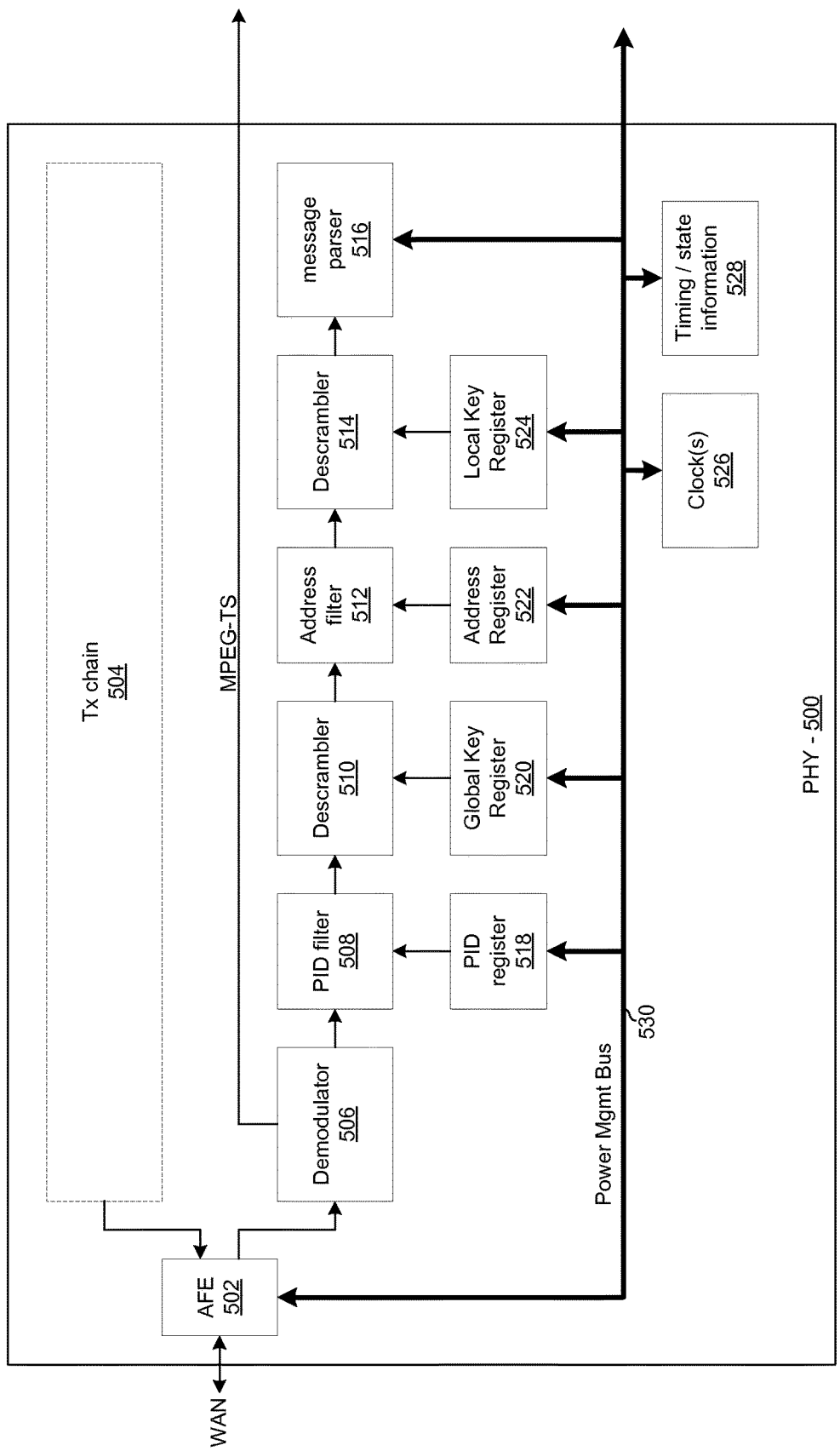
FIG. 5A depicts an exemplary PHY of a CPE which supports low-power wide area networking.
Figure 5B:
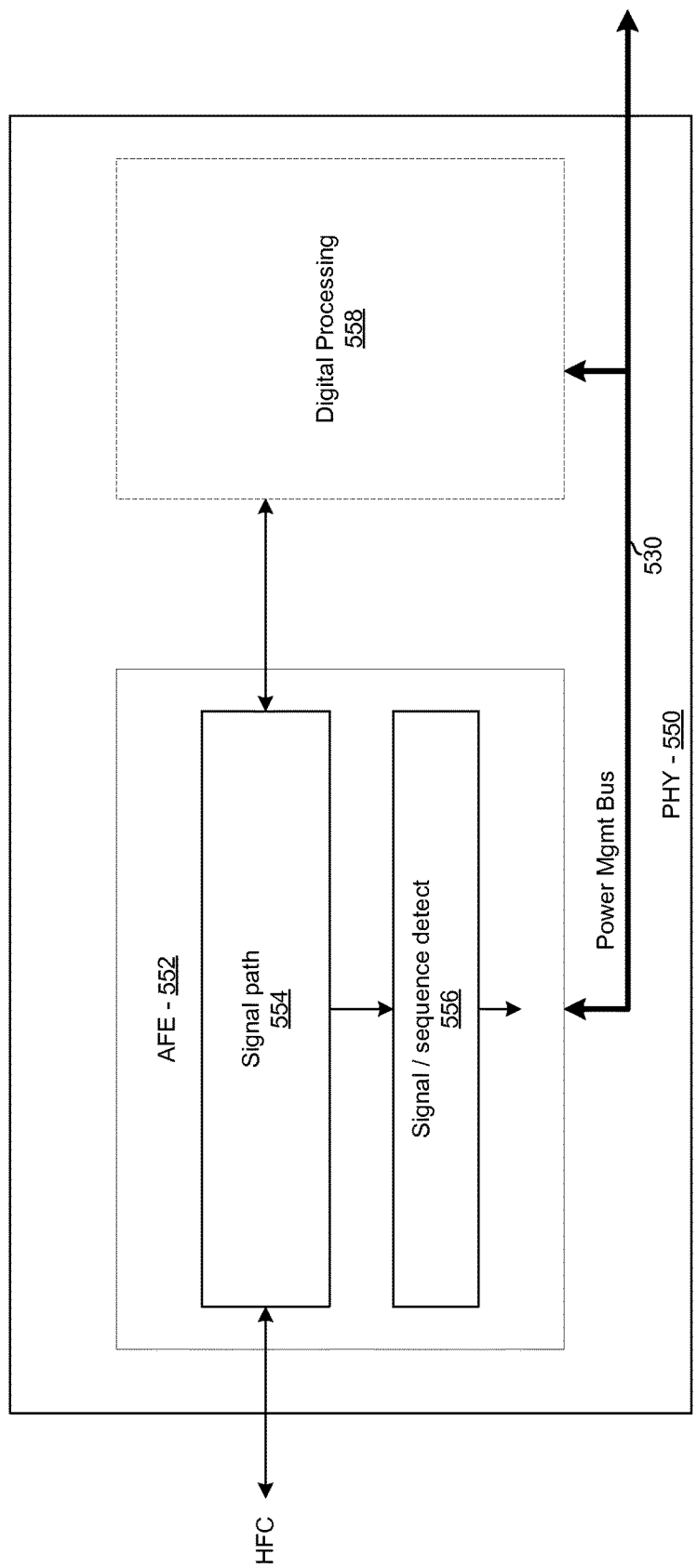
FIG. 5B illustrates an exemplary PHY which is operable to detect physical layer "special messages."

In operation, a mode of operation of one or more components of the cable modem 122 may be controlled via special messages which the PHY 202 may be operable to decode, as described, for example, with respect to FIG. 5A and/or FIG. 5B.

Figure 3:
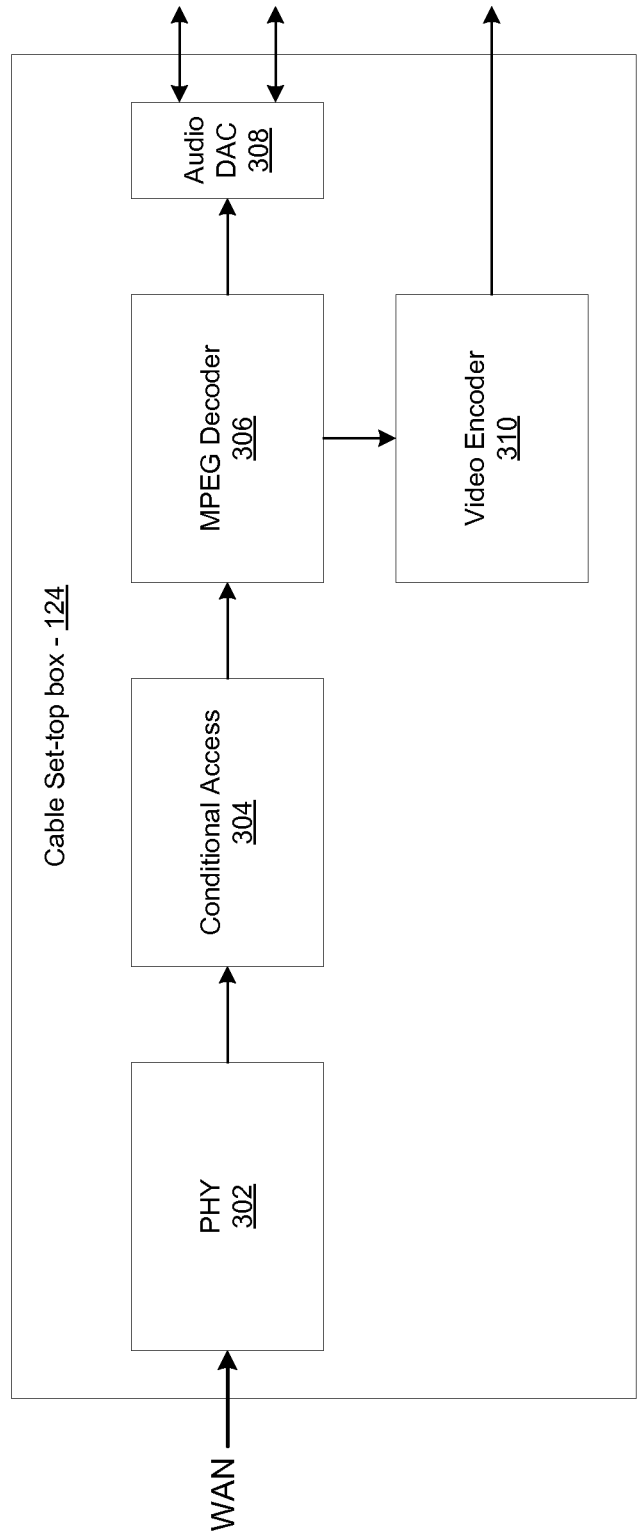
FIG. 3 depicts a cable set-top box as an example of customer premise equipment (CPE).

FIG. 3 depicts a cable set-top box as an example of customer premise equipment (CPE). The set-top box 124 comprises a physical layer transceiver (PHY) module 302, a conditional access module 304, an MPEG decoder module 306, audio digital-to-analog converter (DAC) module 308, and video encoder module 310.

The PHY module 302 may be operable to receive analog symbols over the WAN 118, convert the symbols to digital signals, and convey the digital signals to the MAC module 204. The PHY module 302 may be an instance of the PHY module 500 described below with respect to FIG. 5A or the PHY module 550 described below with respect to FIG. 5B. The conditional access module 304 may be operable to prevent the set-top box 124 from decoding audio/video content to which it is not subscribed. The MPEG decoder module 306 may be operable to decode MPEG streams carried in the signal received via the WAN 118. The Audio DAC module 308 may be operable to convert one or more digital audio signals output by the MPEG decoder 306 into an analog signal for output to one or more speakers. The video encoder 310 may be operable to output one or more digital video signals output by the MPEG decoder 306 according to one or more video protocols such as HDMI or DisplayPort.

In operation, a mode of operation of one or more components of the set-top box 124 may be controlled via special messages which the set-top box 124 may be operable to decode, as described, for example, with respect to FIG. 5A and/or FIG. 5B.

Figure 4:
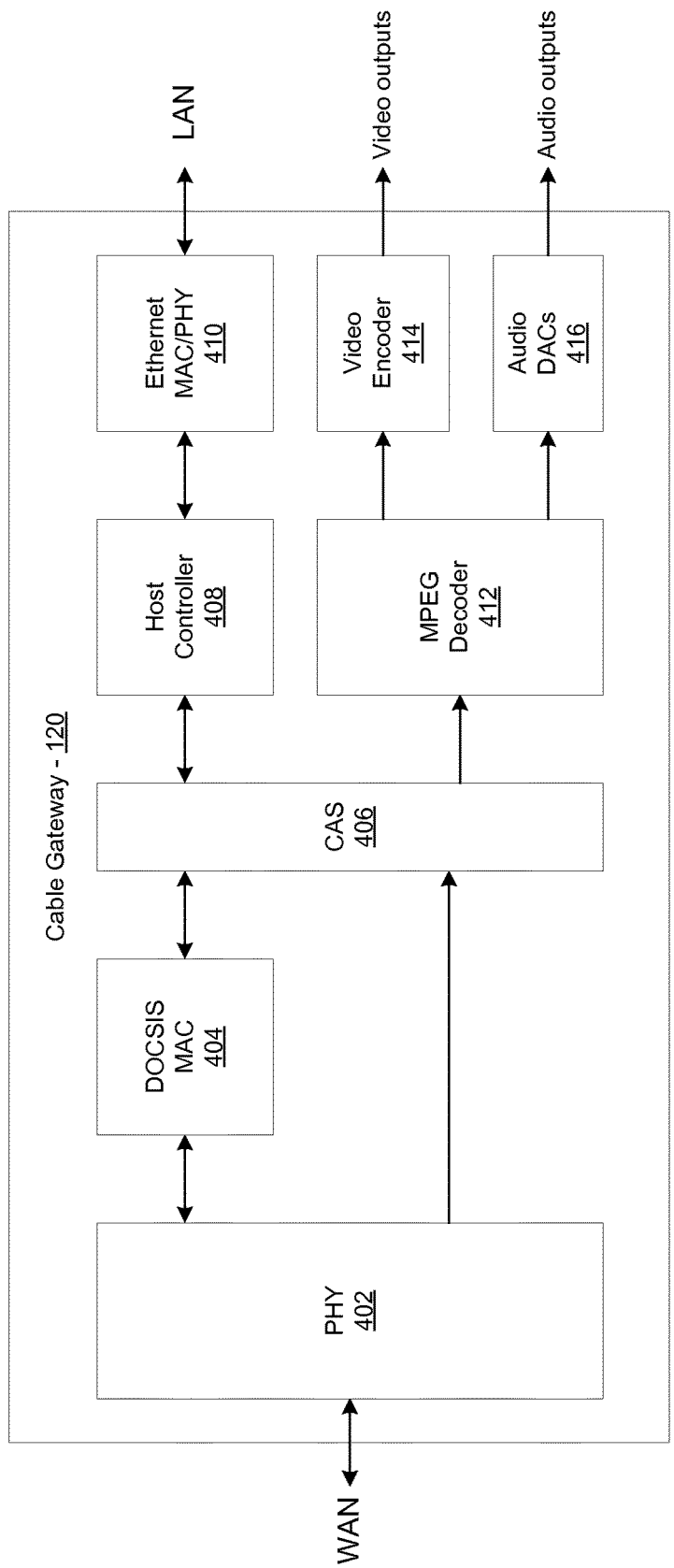
FIG. 4 depicts a cable gateway as an example of customer premise equipment (CPE).

FIG. 4 depicts a cable gateway as an example of customer premise equipment (CPE). The gateway 120 comprises a PHY module 402, a DOCSIS MAC module 404, a conditional access module 406, a host controller module 408, an Ethernet MAC/PHY module 410, an MPEG decoder module 412, a video encoder module 414, and an audio DAC module 416.

The PHY module 402 may be operable to receive digital signals from the MAC 404, generate corresponding analog symbols, and transmit the symbols onto the WAN 118. Similarly, the PHY module 402 may be operable to receive analog symbols over the WAN 118, convert the symbols to digital signals, and convey the digital signals to the MAC module 404. The PHY module 402 may be an instance of the PHY module 500 described below with respect to FIG. 5A or the PHY module 550 described below with respect to FIG. 5B. The MAC module 404 may be operable to implement DOCIS media access control protocol(s) for regulating when and/or how the gateway 120 transmits on the WAN 118. The conditional access module 406 may be operable to prevent the gateway 120 from decoding audio/video content and/or data to which it is not subscribed. The host controller module 408 may be operable to implement OSI layer 3 and higher OSI layers to enable communication between the WAN 118 and the LAN network via the Ethernet MAC/PHY module 410. The Ethernet MAC/PHY module 410 may be operable to implement Ethernet physical layer and data link layer protocols such that the gateway 120 may transmit and receive via an Ethernet local area network (LAN). The MPEG decoder module 412 may be operable to decode MPEG streams carried in the signal received via the WAN 118. The Audio DAC module 416 may be operable to convert one or more digital audio signals output by the MPEG decoder 412 into an analog signal for output to one or more speakers. The video encoder 414 may be operable to output one or more digital video signals output by the MPEG decoder 412 according to one or more video protocols such as HDMI or DisplayPort.

In operation, a mode of operation of one or more components of the gateway 120 may be controlled via special messages which the gateway 120 may be operable to decode, as described, for example, with respect to FIG. 5A and/or FIG. 5B.

FIG. 5A depicts an exemplary PHY of a CPE which supports low-power wide area networking. The PHY 500 comprises an analog front end (AFE) 502, a transmit chain 504, a demodulator module 506, a program identifier (PID) filter module 508, a first descrambler module 510, an address filter module 512, a second descrambler module 514, a message parser module 516, a PID register 518, a global key register 520, an address register 522, a local key register 524, a clock module 526, and a memory module 528 for storing timing and/or state information.

For receive operations, the AFE 502 may be operable to amplify an analog signal received via the WAN 118, down-convert the received signal, filter the received signal, convert the filtered signal to a digital representation, and convey the digital signal to the demodulator 506. For transmit operations, the AFE 502 may be operable to receive a digital signal from the transmit chain 504, convert the digital signal to an analog representation, filter the analog signal, up-convert the signal, and amplify the signal for transmission onto the WAN 118.

The transmit chain 504 may be operable to perform operations to support transmission of data onto the WAN 118. Such operations may comprise encoding, modulating, converting to analog, filtering, and/or amplifying a signal received from higher OSI layers.

The demodulator module 506 may be operable to demodulate the digital signal from the AFE 502 to recover an MPEG transport stream (MPEG-TS) contained therein.

The PID register 518 may store a PID which is utilized for MPEG-TS packets which contain special messages for managing power consumption in the network.

The program identifier (PID) filter module 508 may be operable to filter out ("drop") MPEG-TS packets which have a PID that does not match the PID stored in the PID register 518.

The global key register 520 may store a descrambling key that enables descrambling at least a portion of each MPEG-TS packet passed by the PID filter 508. The global key stored in the register 520 may be common to, for example, all CPEs registered with the CMTS 114 and/or all CPEs which are subscribed to a particular service provider.

The first descrambler module 510 may be operable to descramble, utilizing the key stored in the global key register 520, at least a portion (e.g., an address field) of each MPEG-TS packet that it receives from the PID filter 508.

The address register 522 may store an address assigned to the CPE in which the PHY 500 resides. The address may be assigned, for example, by the CMTS and/or a network administrator. In an exemplary embodiment, the address may be used only for communication of special messages (e.g., messages for power management). That is, the address stored in the address register 522 may be the CPE's address only with respect to MPEG-TS packets having the PID stored in PID register 518; a different address may, for example, be associated with the CPE for other types of traffic.

The address filter module 512 may be operable to filter out ("drop") MPEG-TS packets which have an address that does not match the address stored in the address register 522.

The local key register 524 may store a descrambling key that enables descrambling at least a portion of one or more MPEG-TS packet output by the address filter 512. The local key stored in the register 524 may be unique to, for example, the CPE in which the PHY 500 resides or to CPEs registered with the CMTS 114.

The second descrambler module 514 may be operable to descramble, utilizing the key stored in the local key register 524, at least a portion (e.g., a payload) of one or more MPEG-TS packets that it receives from the address filter 512.

The message parser module 516 may be operable to parse special messages communicated by the CMTS 114, and output corresponding instructions and/or information onto the bus 520 for management of a mode of operation and/or power consumption of the CPE in which the PHY 500 resides. The message parser 516 may, for example, comprise a sequence detector, a look-up table, and/or a state machine.

The clock module 526 may be operable to generate one or more oscillating signals for synchronizing circuitry of the PHY 500 and/or for keeping track of time. The clock module 526 may, for example, comprise a real time clock that enables scheduling events such as transitions into and out of a power-saving mode of operation.

The memory module 528 may be operable to store timing information such as: times at which the CPE is to transition between different modes of operation, amount of time the CPE has been in a particular mode of operation, times at which a special message was received, times at which a special message is expected, times at which to expect an upstream channel descriptor (UCD), times at which to expect a media access plan (MAP), etc. Additionally or alternatively, the memory module 528 may store state information that may enable the PHY 500 to quickly resume communications upon waking from a power-saving mode. Such state info may comprise, for example, upstream frequency to utilize for transmission, frequency on which to listen for reception, symbol rate at which to transmit, modulation profile, carrier offset, equalizer/filter settings, and/or gain settings. In an exemplary embodiment of the invention, before components of a CPE (e.g., a MAC of the CPE or portions of the CPE's PHY) go to sleep, those components may store state information to the module 528. This information may be utilized upon the components waking from the power-saving mode to reduce the time necessary for the components to be ready to receive data from the WAN 118.

In an exemplary embodiment, while the CPE is in power-save mode, the PID filter 508 may filter out any MPEG-TS packets not having a program identifier (PID) indicating that they are a special message (the PID stored in PID register 518). The MPEG-TS packets may be received via the WAN 118 which may be, for example, a cable television network, a satellite television network, a terrestrial television network, a DOCSIS network, a fiber to the X network, or any other suitable network. For MPEG-TS packets having the PID stored in register 518, the first descrambler 510 may descramble an address of the MPEG-TS packet utilizing the key stored in to the register 520. The key may have been, for example, received by the CPE from the CMTS prior to the CPE entering low-power mode. The descrambled address may then be compared to an address stored in the register 522. The address may have been, for example, received by the CPE from the CMTS prior to the CPE entering low-power mode. If the address is not a match, the packet may be dropped since it is not directed to this CPE. If the address of the MPEG-TS packet does match the address in the register 522, then the second descrambler 514 may descramble the payload of the MPEG-TS packet utilizing the key stored in the register 524. The key may have been, for example, received by the CPE from the CMTS prior to the CPE entering low-power mode. For messages that make it to the message parser 516, the message parser 516 may parse the payload of the MPEG-TS packet to recover the special message contained therein. Data and/or instructions based on the special message may then be conveyed onto the power management bus 530 (e.g., to be stored in memory, to update registers/parameters, etc.). The message may, for example, contain instructions for doing something now or later (e.g., "wake up now," "wake up at time X," or "wake up upon occurrence of event Y").

In another exemplary embodiment, special messages may be sent in DOCSIS packets. Accordingly, the DOCSIS PID may be stored in the register 518 and the PID filter 508 may compare the DOCSIS PID with the PID of received MPEG-TS packets. If all packets transmitted on the channel have the same DOCSIS PID, the PID may be absent and the PID filter 508 may be bypassed and/or confirm the absence of a PID. The first descrambler 510 may descramble an address of the MPEG-TS packet utilizing the key stored in the register 520. The key may have been, for example, received by the CPE from the CMTS prior to the CPE entering low-power mode. The descrambled address may then be compared, by the address filter 512, to the address stored in the register 522. The address may have been, for example, received by the CPE from the CMTS prior to the CPE entering low-power mode. If the address is not a match, the packet may be dropped since it is not directed to this CPE. If the address of the MPEG-TS packet does match the address stored in the register 522, then the second descrambler 514 may descramble the payload of the MPEG-TS packet utilizing the key stored in the register 524. The key may have been, for example, received by the CPE from the CMTS prior to the CPE entering low-power mode. The message parser 516 may then parse the DOCSIS packet to determine whether the packet contains a special message. If not, the MPEG-TS packet may be dropped. If the DOCSIS packet does contain a special message, the message parser 516 may process the DOCSIS packet to recover the special message. Data and/or instructions based on the special message may then be conveyed onto the power management bus 530 (e.g., to be stored in memory, to update registers/parameters, etc.). The message may, for example, contain instructions for doing something now or later (e.g., "wake up now," "wake up at time X," or "wake up upon occurrence of event Y").

In another exemplary embodiment, the special messages may be sent in higher-layer protocol data units (PDUs) such as, for example, Ethernet frames. Accordingly, the DOCSIS PID may be stored in the register 518 and the PID filter 508 may compare the DOCSIS PID stored in register 518 with the PID of received MPEG-TS packets. If all packets transmitted on the channel have the same DOCSIS PID, the PID may be absent and the PID filter 508 may be bypassed and/or confirm the absence of a PID. The first descrambler 510 may descramble an address of the MPEG-TS packet utilizing the key stored in the register 520. The key may have been, for example, received by the CPE from the CMTS prior to the CPE entering low-power mode. The descrambled address may then be compared, by the address filter 512, to the address stored in the register 522. The address may have been, for example, received by the CPE from the CMTS prior to the CPE entering low-power mode. If the address is not a match, the packet may be dropped since it is not directed to this CPE. If the address of the MPEG-TS packet does match the address stored in the register 522, then the second descrambler 514 may descramble the payload of the MPEG-TS packet utilizing the key stored in the register 524. The key may have been, for example, received by the CPE from the CMTS prior to the CPE entering low-power mode. The message parser 516 may then parse the DOCSIS packet to extract the higher-layer PDU (e.g., Ethernet frame), and may then parse the higher-layer PDU to determine whether it contains a special message. If the higher-layer PDU does contain a special message, the message parser 516 may process the special message, and output, accordingly, data and/or instructions onto the power management bus 530 (e.g., to be stored in memory, to update registers/parameters, etc.). The special message may, for example, contain instructions for doing something now or later (e.g., "wake up now," "wake up at time X," or "wake up upon occurrence of event Y").

Referring now to FIG. 5B, there is shown a PHY 550 which may reside in a CPE such as the cable modem 122, the set-top box 124, or the gateway 120. The PHY 550 comprises an analog front end module 552, a digital processing module 558, and a power management bus 530. The AFE 552 comprises a signal path module 554 and a signal/sequence detect module 556.

For receive operations, the signal path module 554 may be operable to, for example, amplify a received analog signal via the WAN 118, down-convert the received signal, filter the received signal, convert the filtered signal to a digital representation, and convey the digital signal to the digital processing module 558. For transmit operations, the signal path module 554 may be operable to, for example, receive a digital signal from the digital processing module 558, convert the digital signal to an analog representation, filter the analog signal, up-convert the signal, and amplify the signal for transmission onto the WAN 118.

The signal/sequence detect module 556 may comprise, for example, one or more filters, comparators, and/or other components for detecting RF energy having particular characteristics. The module 556 may be operable to detect, for example, energy over a determined period of time, voltage, sequence of voltages, frequency, sequence of frequencies, pulse duration, duty cycle, and/or sequence of duty cycles. Upon detecting a distinct signal/sequence that corresponds to a special message, the signal/sequence detect module 556 may generate an interrupt, an instruction, and/or other signal(s) to be conveyed on the power management bus 530.

For receive operations, the digital processing module 558 may be operable to process the output of the AFE 552 to recover data carried in the received signals. Such processing may comprise, for example, demodulation, filtering, decoding, encoding, and/or digital to analog conversion. For transmit operations, the digital processing module 558 may be operable to generate digital signals to be transmitted and process the signals for conveyance to the signal path 554. Such processing may comprise, for example, modulation, filtering, and/or encoding.

In an exemplary embodiment, "special messages" may be communicated in the form of physical layer signals (i.e., generated and/or processed at OSI layer 1). Such physical layer signals could comprise, for example, a simple synchronization signal. A physical layer special message could be sent as an RF signal, or sequence of signals, having distinct characteristics (e.g., frequency, amplitude, duration) that indicate to the receiver that it is a special message. For example, RF energy having a particular frequency, amplitude, and/or duration could convey a message that the CPE should, for example, wake up one or more of its components (e.g., MAC, MPEG decoder, etc.) and/or put one or more of its components (e.g., MAC, MPEG decoder, etc.) into a power-saving state. Additional distinct signals/sequences of RF energy could enable additional messages. For example, a first distinct signal/sequence could instruct the CPE to sleep for a predetermined amount of time, a second distinct signal/sequence could instruct the CPE to sleep until it receives a subsequent special message, a third distinct signal/sequence could instruct the CPE to wake up now, etc. In an embodiment of the invention, such physical layer special messages may be transmitted and/or received by the PHY without powering up other parts of the CPE, (e.g. the MAC). This can serve a number of purposes, including allowing the CPE to function with very low duty cycle, thereby achieving very low power. As an example, a PHY may be operable to send an unencrypted synchronization sequence with a predetermined PID.

In an embodiment of the invention, there may be a fixed and/or deterministic time relationship between special messages and other control messages (e.g., MAP and/or UCD) transmitted by the CMTS 114. For example, a special message to wake up a CPE may be sent a fixed and/or deterministic amount of time before a MAP update. Accordingly, upon receiving the special message, the CPE may begin counting down this fixed and/or deterministic amount of time and then listen for a MAP update as the timer expires. The fixed and/or deterministic amount of time may, for example, be preprogrammed into the network CPEs by a network administrator.

To support the low-power mode of operation of the CPE, the CMTS 114 may need to be configured such that it knows when a CPE is sleeping vs. powered-off. In this manner, the CMTS 114 may know not to de-register the CPE from the network while it is sleeping. By not de-registering the CPE, the CPE can more quickly resume communications on the network. The CMTS 114 may implement a control policy for controlling, for example: when CPEs may sleep, how long CPEs should sleep, what events and/or conditions should cause CPEs to sleep or wake, etc. Inputs to the control policy could include, for example, the status of buffers, the time of day, the type of CPE (e.g., set-top box, modem, or gateway), the level of service of the client CPE (e.g., subscription level), user preference, etc.

In an embodiment of the invention, the CMTS 114 may reserve some amount of bandwidth for a sleeping CPE. The reserved amount of bandwidth may be used, for example, to enable the CPE to come out of sleep mode on its own, rather than waiting for a time agreed-upon with the CMTS 114 and/or instead of waiting for a special message from the CMTS 114.

The CMTS 114 may support some initial messaging/communication with the CPE (e.g., cable modem 122) to coordinate sleep cycles of the CPE. To enable a sleep mode in the CPE, the CMTS 114 may assign a PID to be used with the special messages and may notify the CPE of the assigned PID, may assign one or more descrambling/decryption keys (e.g., global and local descrambling keys) for processing special messages and may notify the CPE of the assigned PID, and may assign an address to the CPE and notify the CPE that it should look for special messages destined for the assigned address. Multiple CPEs, for example, could be given a common address on which to receive special messages such that a single message could coordinate the sleep of the multiple CPEs. Similarly, different addresses may be assigned to different CPEs such that sleep cycles of different CPEs may be controlled differently. For example, the CMTS 114 could stagger sleep intervals of groups of CPEs.

Figure 6:
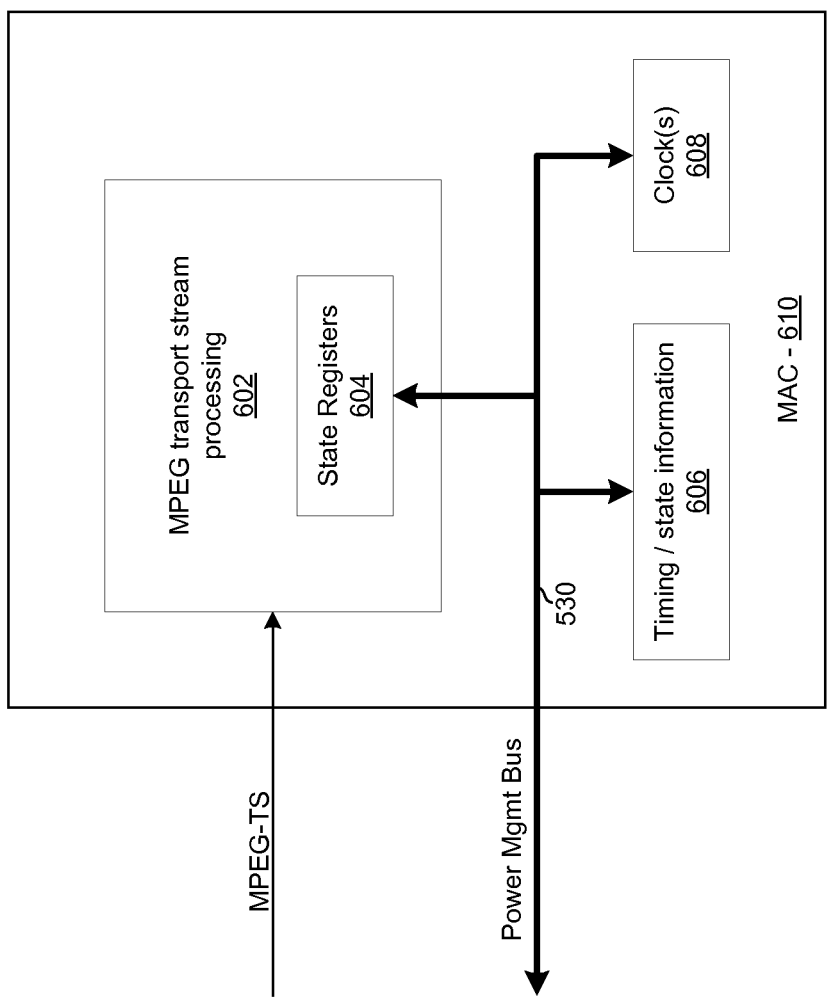
FIG. 6 depicts an exemplary medium access controller (MAC) of a CPE which supports low-power wide area networking.

FIG. 6 illustrates an exemplary MAC of a CPE. The MAC 610 may be capable of operating in multiple modes of operation, with different modes of operation being characterized by different power consumption. In an exemplary embodiment, the MAC 610 may support a "normal" mode characterized by higher power consumption and a "sleep" mode characterized by lower power consumption, and may occasionally and/or periodically be put into the sleep mode to reduce power consumption.

In some instances, the PHY (e.g., PHY 500 or 550) of a CPE may operate in a higher-power mode (i.e., be "awake") while the MAC (e.g., MAC 610) of the CPE remains in a low-power mode (i.e., be "asleep"). During such times, the PHY may resynchronize a clock utilized for transmitting signals onto the WAN 118 to the clock utilized for receiving signals via the WAN 118. Such synchronization may reduce the time needed to be ready to transmit upon the MAC transitioning out of the low-power mode.

In an exemplary embodiment of the invention, channel bonding as enabled in DOCSIS 3.0 may be controlled in coordination with the sleep cycle of the CPE. For example, while awake, a CPE may receive and/or transmit on multiple channels, but while in a sleep mode, only one channel may be allocated for the CPE (the one channel could also be, for example, shared among multiple sleeping CPEs). Special messages may be utilized to coordinate channel bonding.

Figure 7:
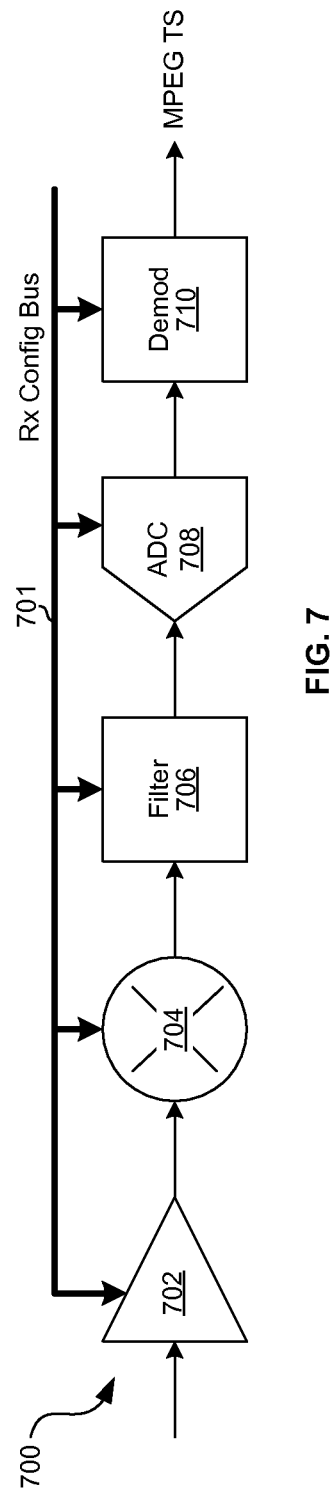
FIG. 7 depicts a receive portion of a network device which is operable to communicate with customer premise equipment that supports a power-saving mode of operation.

FIG. 7 depicts a receive portion of a network device which is operable to communicate with customer premise equipment that supports a power-saving mode of operation. The receiver 700 comprises a low noise amplifier (LNA) module 702, a mixer module 704, a filter module 706, an analog-to-digital converter (ADC) 708, and a demodulator 710.

The low noise amplifier (LNA) 702 may be operable to amplify signals received via the WAN 118. The mixer 704 may be operable down-convert received signals. The filter 706 may be operable to select one or more sub-bands of the received, down-converted signal. The analog-to-digital converter (ADC) 708 may be operable to convert the analog signal output by filter 706 to a digital representation. The demodulator 710 may be the same as the demodulator 506 and may be operable to demodulate the digital signal from the ADC 708 to recover an MPEG transport stream (MPEG-TS) contained therein.

In operation, a mode of operation of various components (e.g., amplifier 702, mixer 704, filter 706, data converter 708, and demodulator 710) of the receiver 700 may be controlled based on whether the receiver 700 is receiving, or expecting to receive, messages from a CPE in a normal mode of operation or a CPE in a low-power mode of operation. In this regard, the receiver 700 may be operable to receive a first type of message from devices operating in a low-power mode, and a second type of message from devices not operating in a low-power mode. An example of the first type of message is a "heartbeat" or other special message indicating that a CPE is still connected but in a low-power mode. An example of the second type of message is a conventional MPEG-TS packet communicated in a conventional DOCSIS network. Messages of the first type (e.g., "special messages" for managing power consumption and modes of operation) may have different characteristics than messages of the second type. For example, the different message types may be modulated differently, use different interleaver depth, have different timing, different amplitude, etc. Accordingly, one or more of the components 702-710 may be configured, via the bus 701, into a first configuration for receiving messages of the first type (messages from devices operating in a low-power mode), and into a second configuration for receiving messages of the second type (messages from devices not operating in a low-power mode).

Figure 8:
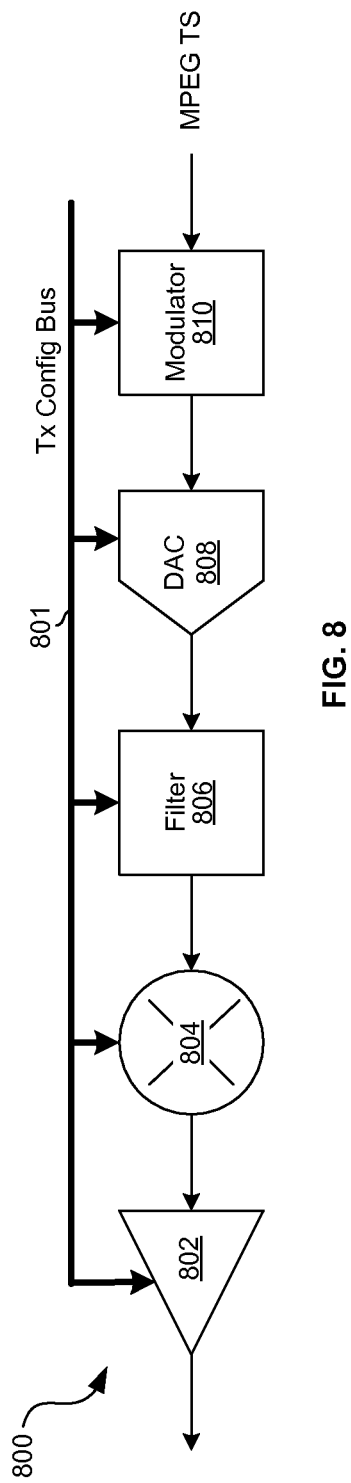
FIG. 8 depicts a portion of a transmitter of a network device which is configurable based on a mode of operation of customer premise device to which the network device is transmitting.

FIG. 8 depicts a portion of a transmitter of a network device which is configurable based on a mode of operation of a customer premise device to which the network device is transmitting. The transmitter 800 comprises a power amplifier (PA) module 802, a mixer module 804, a filter module 806, a digital-to-analog converter (DAC) 808, and a modulator 810.

The power amplifier (PA) 802 may be operable to amplify signals for transmission onto the WAN 118. The mixer 804 may be operable up-convert signals to be transmitted. The filter 806 may be operable to filter out undesired signals output by the DAC 808. The DAC 808 may be operable to convert the digital signal output by modulator 810 to an analog representation.

The modulator 810 may be operable to modulate a MPEG transport stream onto a carrier. In an exemplary embodiment, hierarchical modulation may be utilized for multiplexing multiple data streams into a single symbol stream. A first one of the data streams may be a low-bandwidth stream comprising, for example, special messages, and a second one of the streams may be a high-bandwidth stream comprising, for example, normal DOCSIS traffic (i.e., messages other than the special messages). The modulator 810 may utilize, for example, QPSK modulation with lower interleaver depth for transmitting the first stream, while utilizing, for example, 64QAM or 256QAM modulation with higher interleaver depth for transmitting the second stream.

In operation, a mode of operation of various components (e.g., amplifier 802, mixer 804, filter 806, data converter 808, and modulator 810) of the transmitter 800 may be controlled based on the type of message that the transmitter 800 is transmitting. In this regard, a first type of message may be transmitted when communicating with customer premise equipment in a power-saving mode, and a second type of message may be transmitted when communicating with customer premise equipment not in a power-saving mode. An example of the first type of message is a "wake up" or other special message instructing the CPE to transition out of a low-power mode. An example of the second type of message is a conventional MPEG-TS packet communicated in a conventional DOCSIS network. The different types of messages may have different characteristics. For example, the different message types may be modulated differently (e.g., different modulation order), use different interleaver depth, have different timing, different amplitude, etc. Accordingly, one or more of the components 802-810 may be configured, via the bus 801, into a first configuration for receiving messages of the first type (messages from devices operating in a low-power mode), and into a second configuration for receiving messages of the second type (messages from devices not operating in a low-power mode).

Figure 9:
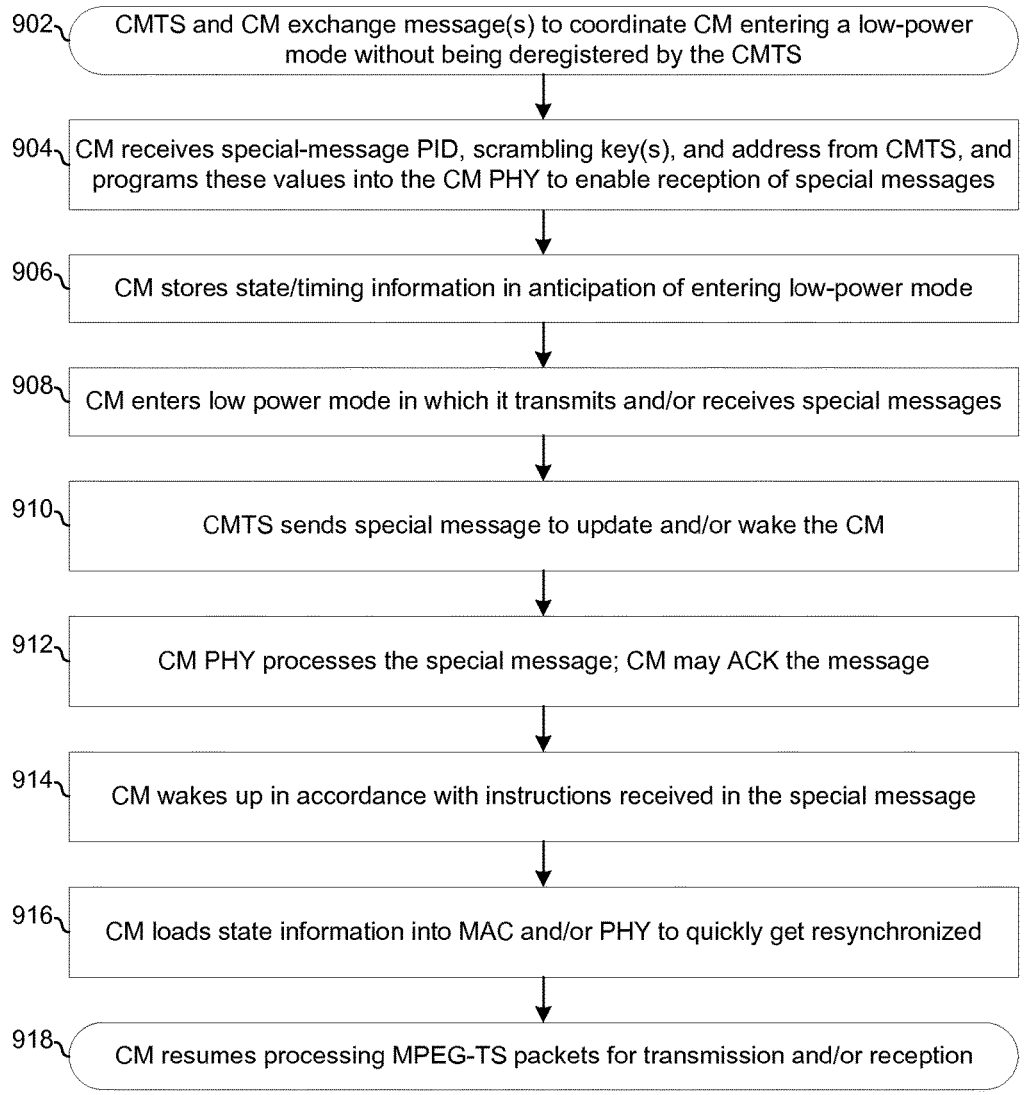
FIG. 9 is a flowchart illustrating exemplary steps for managing power consumption via special messaging.

FIG. 9 is a flowchart illustrating exemplary steps for managing power consumption via special messaging. For illustration, the steps are described with reference to cable modem 122 and CMTS 114, but are not limited to any particular devices. In step 902, the CMTS 114 and the cable modem 122 are operating in a normal mode of operation and may exchange message(s) (of a first type) to coordinate the cable modem 122 transitioning to a low-power mode without being de-registered by the CMTS 114.

In step 904, the CMTS 114 sends one or more of the following to the cable modem 122: a PID associated with special messages; keys for descrambling special messages; an address to be associated with the cable modem 122 for the purposes of special messages. The values received in step 904 may be stored in the registers 518-524.

In step 906, prior to transitioning to a low-power state of operation, the cable modem 122 stores state and/or timing information to the memory module 528. At a later time, when the cable modem 122 transitions back to a normal mode of operation, the stored state and/or timing information may enable the cable modem 122 to quickly resynchronize and/or recalibrate settings and/or parameters which may have become stale as a result of, for example, the cable modem 122 missing upstream channel descriptors, missing MAP updates, and not performing station maintenance (ranging) during the period that the cable modem 122 was in the low-power mode.

In step 908 the cable modem 122 transitions to a low-power mode. While in the low-power mode, communications between the cable modem 122 and CMTS 114 may be limited to reception and/or transmission of messages of a second type ("special" or "power management" messages). Accordingly, while the cable modem 122 is in sleep mode, the CMTS 114 may be configured to transmit messages of the second type when transmitting to the cable modem 122 and to receive messages of the second type when listening for messages from the cable modem 122.

In step 910 the CMTS 114 generates a message of the second type utilizing the PID, scrambling keys, and address communicated to the cable modem 122 in step 904. The CMTS 114 may transmit the message to the cable modem 122 via the WAN 118.

In step 912, the cable modem 122 receives and detects the message transmitted in step 910. In an exemplary embodiment, the cable modem 122 may generate and send a message of the second type to acknowledge receipt of the message sent in step 910.

In step 914, the cable modem 122 wakes up in accordance with the message received in step 912. For example, if the special message is a "wake up now" message, the cable modem 122 may immediately begin a transition out of the low-power mode (e.g., reads state information out of memory module 528. As another example, if the message is a "wake up in X seconds" message, the cable modem 122 may set a countdown timer to value X seconds and immediately begin a transition out of the low-power mode upon expiration of the timer.

In step 916, as part of the transition to a normal mode of operation, the cable modem 122 may utilize state information from the memory module 528 to recalibrate and/or resynchronize one or more components.

In step 918, the cable modem 122 may resume transmission and reception of traffic other than special messages.

Figure 10:
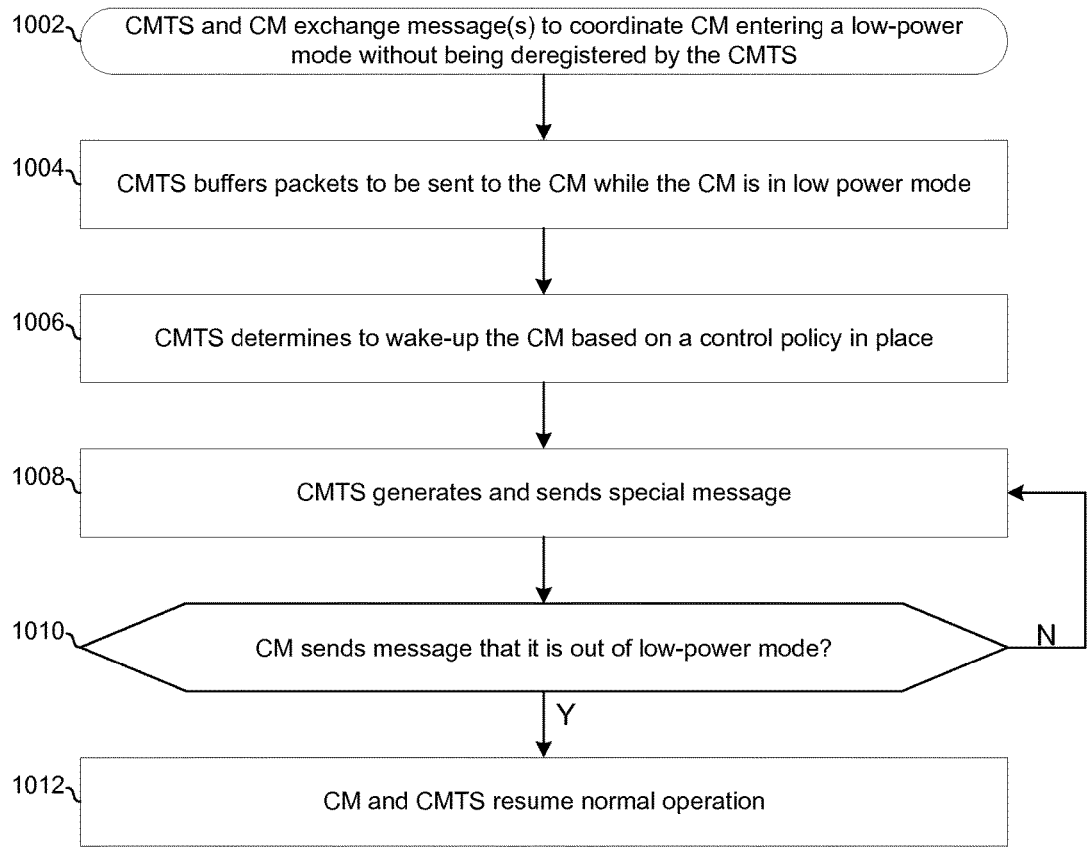
FIG. 10 is a flowchart illustrating exemplary steps performed in a low-power wide area network.

FIG. 10 is a flowchart illustrating exemplary steps performed in a low-power wide area network. For illustration, the steps are described with reference to cable modem 122 and CMTS 114, but are not limited to any particular devices. In step 1002, the CMTS 114 and the cable modem 122 may exchange messages (e.g., messages of a first type) to coordinate the cable modem 122 sleeping for a period of time without being de-registered by the CMTS 114. In step 1004, while the cable modem 122 is sleeping, the CMTS 114 buffers packets to be sent to the cable modem 122. In step 1006, the CMTS 114 determines to wake up the cable modem 122 based on a power management control policy in place in the network. In step 1008, the CMTS 114 generates a message (e.g., message of a second type to wake up the cable modem and sends it to the cable modem 122. In step 1010, the CMTS 114 waits for a message of a first type indicating that the cable modem 122 has transitioned out of the low-power mode and/or for a message of a second type indicating that the cable modem 122 will transition out of the power-saving mode. If such a message does not arrive within a determined amount of time, then the steps may return to step 1008. Conversely, if such a message is received, the exemplary steps may advance to step 1012. In step 1012, the CMTS 114 and cable modem 122 may resume normal communications of exchanging MPEG-TS packets.

Figure 11:
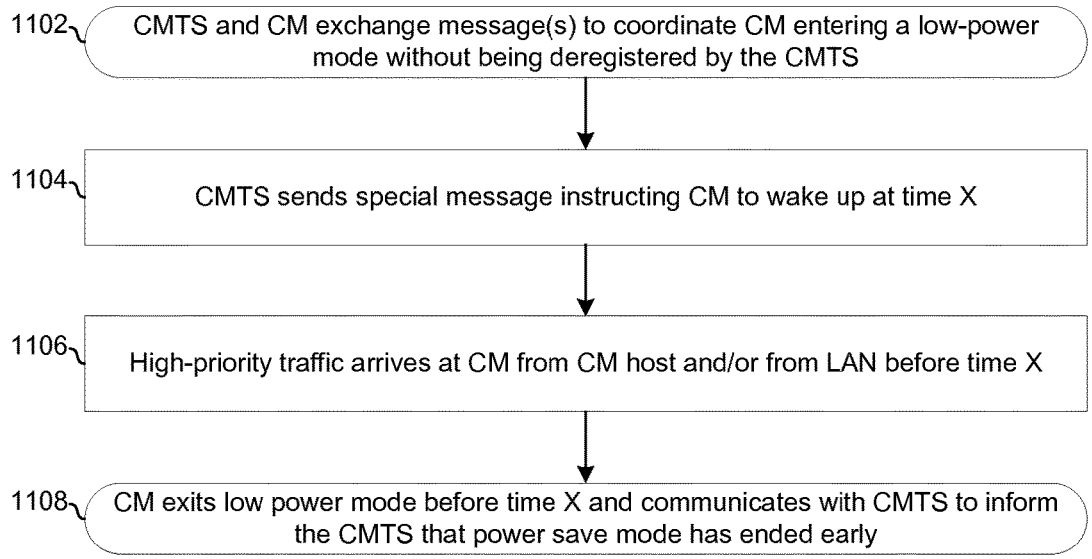
FIG. 11 is a flowchart illustrating exemplary steps performed in a low-power wide area network.

FIG. 11 is a flowchart illustrating exemplary steps performed in a low-power wide area network. For illustration, the steps are described with reference to cable modem 122 and CMTS 114, but are not limited to any particular devices. In step 1102, the CMTS 114 and the cable modem 122 may exchange messages of a first type to coordinate the cable modem 122 sleeping for a period of time without being de-registered by the CMTS 114. In step 1104, while the cable modem 122 is sleeping, the CMTS 114 sends a message of a second type instructing the cable modem 122 to wake up at time X. In step 1106, prior to time X, high-priority traffic may be generated by the host 218 and/or received by the cable modem 122 via the Ethernet MAC/PHY 206. In step 1108, in response to the need to send the high-priority traffic, the cable modem 122 may wake up and communicate (e.g., using message(s) of the second type) with the CMTS 114 to inform the CMTS 114 that the cable modem 122 has exited the power-saving mode early.

Figure 12A:
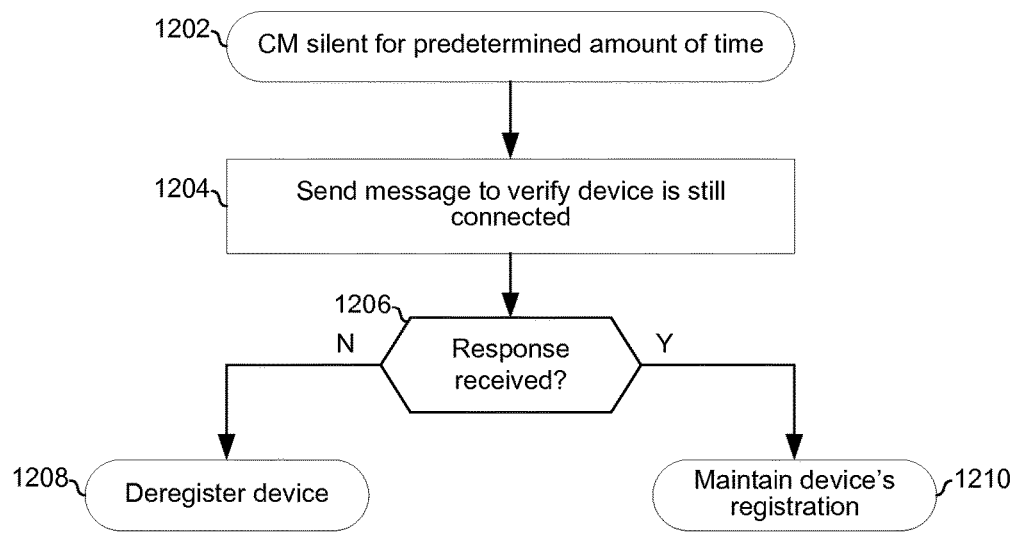
FIG. 12A is a flowchart illustrating exemplary steps managing device registration in a low-power wide area network.

FIG. 12A is a flowchart illustrating exemplary steps managing device registration in a low-power wide area network. In step 1202, the CMTS 114 has not heard from a customer premise device for more than a predetermined amount of time. In response, in step 1204, the CMTS 114 sends a message (e.g., of a second type) to verify that the customer premise device is sleeping (and has not been disconnected). In step 1206, if the CMTS 114 receives a reply to the message sent in step 1204, then in step 1210 the CMTS 114 may maintain the registration of the customer premise device in question. If the CMTS 114 does not receive a reply, then in step 1208 the CMTS 114 may deregister the customer premise device in question.

Figure 12B:
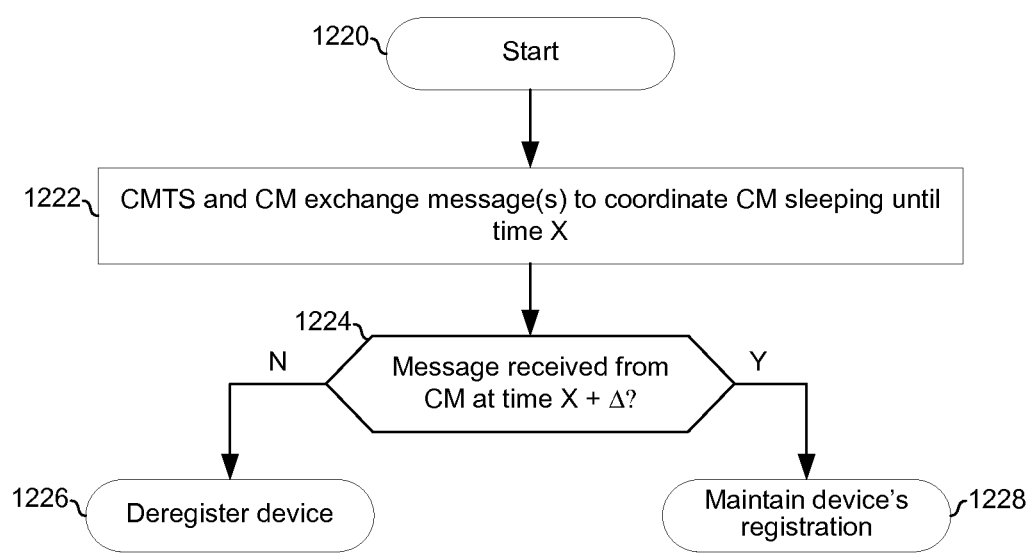
FIG. 12B is a flowchart illustrating exemplary steps managing device registration in a low-power wide area network.

FIG. 12B is a flowchart illustrating exemplary steps managing device registration in a low-power wide area network. In step 1222, after start step 1220, the CMTS 114 and the cable modem 122 may exchange messages (e.g., messages of a first type) to coordinate the cable modem 122 sleeping until time X. In step 1224, at time X+Δ, where Δ is the amount of time required for the cable modem 122 to wake up and transmit, the CMTS 114 may listen for a message from the cable modem 122 indicating that the cable modem 122 has exited the low-power mode. If the CMTS 114 does not receive such a message, then in step 1228 the cable modem 122 may be deregistered. If the CMTS 114 does receive such a message, then the cable modem 122 may remain registered.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a low-power wide area network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a network device which manages a network connection of customer premise equipment, wherein:
while said customer premise equipment is operating in a normal mode of operation, said network device communicates with said customer premise equipment utilizing one or more messages of a first type, wherein said one or more messages of said first type comprise an MPEG transport packet not having a particular program identifier; and
while said customer premise equipment is operating in a low-power mode of operation, said network device communicates with said customer premise equipment utilizing one or more messages of a second type, wherein said one or more messages of said second type comprise an MPEG transport packet having said particular program identifier.

2. The system of claim 1, wherein said network device is a cable modem termination system and said customer premise equipment is a cable modem.

3. The system of claim 1, wherein:
said one or more messages of said first type comprise an MPEG transport packet having a first value in a destination address field; and
said one or more message of said second type comprises an MPEG transport packet having a second value in said destination address field.

4. The system of claim 1, wherein said one or more messages of said first type instruct said customer premise equipment to enter said low-power mode.

5. The system of claim 1, wherein said one or more messages of said second type instruct said customer premise equipment to exit said low-power mode.

6. The system of claim 1, wherein a modulation scheme used for generating said one or more messages of said first type is of a higher-order than a modulation scheme used for generating said one or more messages of said second type.

7. The system of claim 1, wherein an interleaver depth used for generating said one or more messages of said first type is larger than an interleaver depth used for generating said one or more messages of said second type.

8. The system of claim 1, wherein said network device is operable to distinguish between: (i) said customer premise equipment that is powered-off and/or disconnected from said network device; and (ii) said customer premise equipment that is in said low-power mode.

9. The system of claim 8, wherein said network device is operable to:
deregister said customer premise equipment when said customer premise equipment is powered-off and/or disconnected from said network device; and
maintain a registration of said customer premise equipment when said customer premise equipment is in said low-power mode.

10. The system of claim 1, wherein:
said message of said first type comprises an MPEG transport packet; and
said message of said second type comprises non-packetized, physical layer signals.

11. The system of claim 1, wherein:
while said customer premise equipment is operating in said normal mode of operation, said network device is configured to receive messages of a first type from said customer premise equipment; and
while said customer premise equipment is operating in said low-power mode of operation, said network device is configured to receive messages of a second type from said customer premise equipment.

12. A method comprising:
performing by a network device:
determining a particular program identifier to be utilized for messages that manage power consumption of one or more customer premise devices coupled to said network device; and
transmitting one or more messages to said one or more customer premise devices, wherein:
the portion of said one or more messages that are transmitted while said one or more customer premise devices are in a low-power mode comprises MPEG transport packets having said particular program identifier; and
the portion of said one or more messages that are transmitted while said one or more customer premise devices are not in said low-power mode comprises MPEG transport packets not having said particular program identifier.

13. The method of claim 12, wherein said network device comprises a cable modem termination system (CMTS) and said one or more customer premise devices comprise one or more cable modems.

14. The method of claim 12, wherein:
- the portion of said one or more messages that are transmitted while said one or more customer premise devices are in a low-power mode comprises MPEG transport packets having a first value in a destination address field; and
- the portion of said one or more messages that are transmitted while said one or more customer premise devices are not in said low-power mode comprises MPEG transport packets having a second value in said destination address field.

15. The method of claim 12, wherein said one or more transmitted messages control when said one or more customer premise devices are in said low-power mode and when said one or more customer premise devices are not in said low-power mode.

16. The method of claim 15, wherein said network device controls when said one or more customer premise devices are in said low-power mode based on the status of one or more buffers in the network device.

17. The method of claim 15, wherein said network device controls when said one or more customer premise devices are in said low-power mode based on a real time clock of said network device.

18. The method of claim 15 wherein said network devices controls when said one or more customer premise devices are in said low-power mode based on the level of service to which said one or more customer premise devices are subscribed.

19. The method of claim 15, comprising:
- determining whether said one or more customer premise devices are: (i) in said low-power mode or (ii) powered off and/or disconnected from said network device;
- maintaining a registration of said one or more customer premise devices if said one or more customer premise devices are in said low-power mode; and
- deregistering said one or more customer premise devices if said one or more customer premise devices are powered off or disconnected from said network device.

* * * * *